United States Patent [19]

Pannier et al.

[11] Patent Number: 5,272,998
[45] Date of Patent: Dec. 28, 1993

[54] LIVESTOCK FEEDER WITH FEED METERING ABOVE FEED SPACE

[76] Inventors: Steven R. Pannier, P.O. Box 72; Richard H. Pannier, P.O. Box 356, both of McLean, Ill. 61754

[21] Appl. No.: 836,118

[22] Filed: Mar. 4, 1986

[51] Int. Cl.$^5$ .................................................. A01K 5/00
[52] U.S. Cl. ....................................... 119/53.5; 119/54; 119/71
[58] Field of Search ............... 119/53.5, 54, 51.5, 119/71, 72.5, 52.4

[56] References Cited

U.S. PATENT DOCUMENTS

| | | | |
|---|---|---|---|
| 856,164 | 6/1907 | Koehler | 119/52.4 |
| 1,269,943 | 6/1918 | Leonard | 119/54 |
| 1,290,373 | 1/1919 | Shaw | 119/54 |
| 1,346,027 | 7/1920 | Hiner | 119/53.5 |
| 1,362,974 | 12/1920 | Wagner | 119/54 |
| 1,395,307 | 11/1921 | Stuart | 119/53.5 |
| 1,505,157 | 8/1924 | Markey | 119/54 |
| 1,591,837 | 7/1926 | Kache | 119/53.5 |
| 1,894,278 | 1/1933 | Martin | 119/53.5 |
| 3,285,226 | 11/1966 | Schuler | 119/71 |
| 4,246,678 | 1/1981 | Cunningham | 119/54 |
| 4,306,518 | 12/1981 | Herring | 119/53.5 |
| 4,315,484 | 2/1982 | Kingery | 119/54 |
| 4,351,274 | 9/1982 | Pannier | 119/53.5 |
| 4,377,130 | 3/1983 | Schweiber | 119/51.5 |
| 4,444,151 | 4/1984 | Bohlmann | 119/53.5 |
| 4,491,087 | 1/1985 | Herring, Sr. | 119/53.5 |

FOREIGN PATENT DOCUMENTS

| | | | |
|---|---|---|---|
| 275720 | 6/1914 | Fed. Rep. of Germany | 119/53.5 |
| 462789 | 2/1914 | France | 119/53.5 |
| 67371 | 8/1913 | Switzerland | 119/53.5 |

*Primary Examiner*—Kenneth J. Dorner
*Assistant Examiner*—Brian K. Green
*Attorney, Agent, or Firm*—Jacobson, Price, Holman & Stern

[57] ABSTRACT

A livestock feeder which includes a feed trough and a feed storage bin above the trough in which an agitator operated by the feeding animal enables efficient movement of feed into the trough with an adjustable meter gate controlling the rate of feed flow. The feeder can be used as a dry feeder or a wet feeder with a wet nipple at each feeding station. The structure of the feeder provides more even distribution of feed, efficient feed discharge and a feeder in which it is easy to maintain sanitary conditions by being able to completely close the meter gate and by moving dividers above the feed trough into an out-of-the-way position.

7 Claims, 3 Drawing Sheets

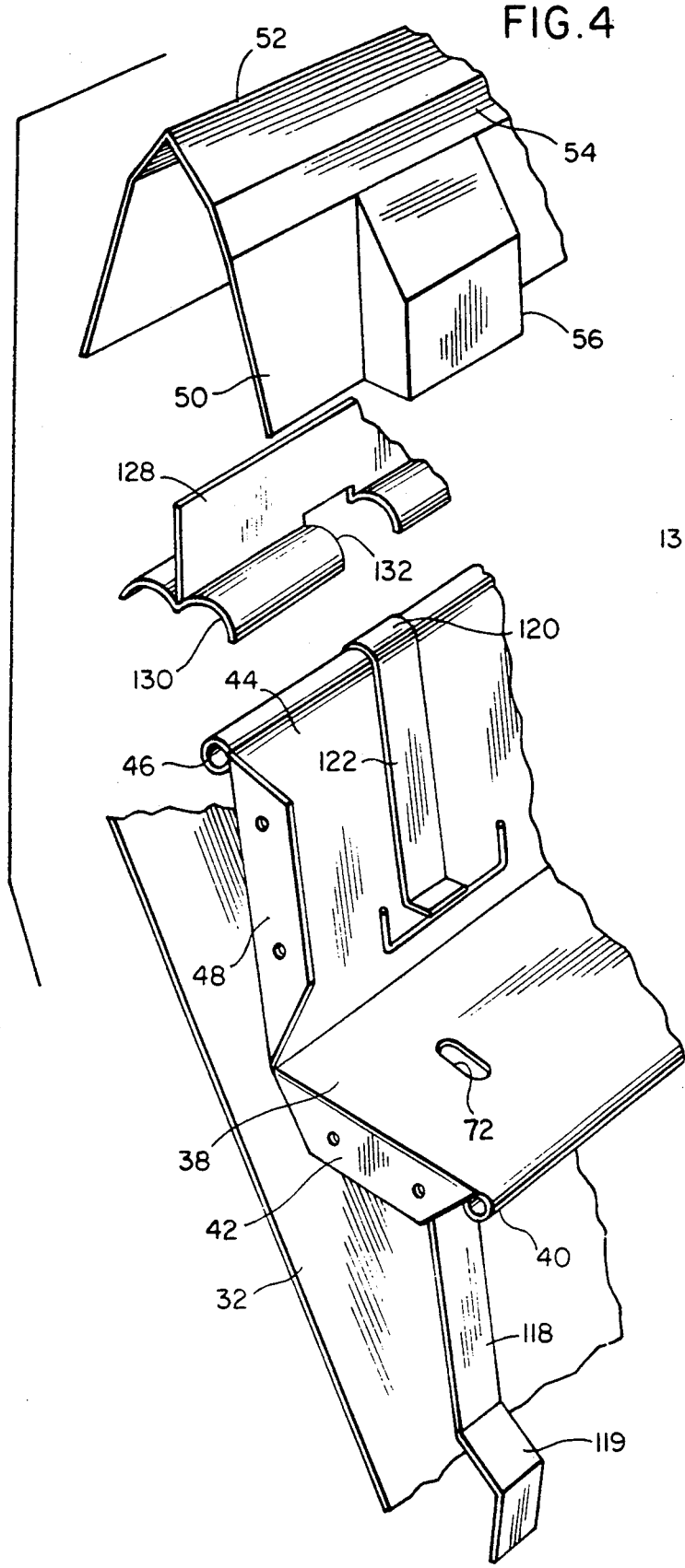
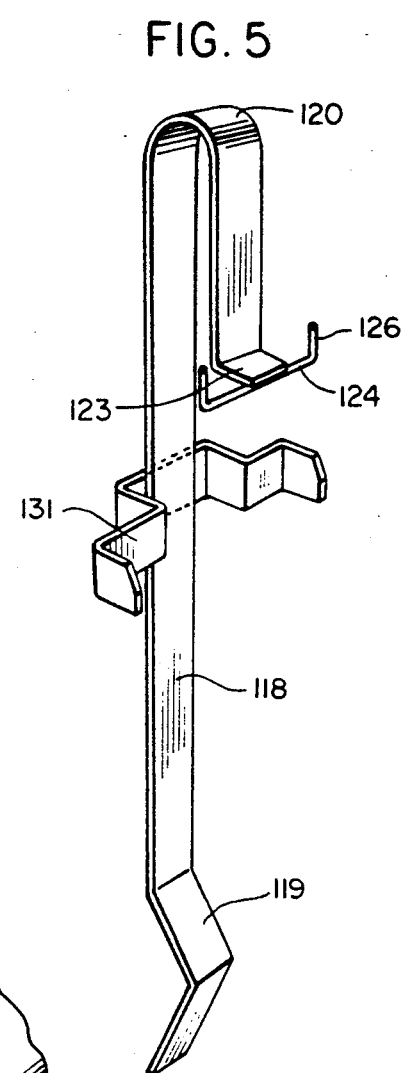

LIVESTOCK FEEDER WITH FEED METERING ABOVE FEED SPACE

BACKGROUND OF THE INVENTION

1. Field of the Invention

The present invention generally relates to livestock feeders and more particularly a swine feeder which includes a feed trough and a feed storage bin above the trough in which an agitator operated by the feeding animal enables efficient movement of feed into the trough with an adjustable meter gate controlling the rate of feed flow. The feeder can be used as a dry feeder or a wet feeder with a wet nipple at each feeding station. The structure of the feeder provides more even distribution of feed, efficient feed discharge and a feeder in which it is easy to maintain sanitary conditions by being able to completely close the meter gate and by moving dividers above the feed trough into an out-of-the-way position.

2. Information Disclosure Statement

Prior U.S. Pat. Nos. 3,019,766 and 4,351,274 disclose livestock feeders of this general type and have performed satisfactorily but the present invention incorporates many unique improvements over the above two patents and all of the other prior art cited in those two patents.

SUMMARY OF THE INVENTION

An object of the present invention is to provide a livestock feeder especially for hogs but adaptable for use by other animals including a feed bin oriented above a feed trough for gravity flow of feed from the bin to the trough with a unique meter gate, agitator arrangement and associated structural details for efficient movement of feed and efficient control of the rate of flow of feed from the feed bin to the trough.

Another object of the invention is to provide a livestock feeder in accordance with the preceding object in which the meter gate between the bin and trough can be adjusted to control the rate of flow of feed, or completely closed when desired, with the structure including an agitator and baffle arrangement to keep the weight of the feed off the agitators with a feed shelf being providing in association with the meter gate to isolate the feed from the feeding animals, rodents, inclement weather and the like.

A further object of the invention is to provide an animal feeder in accordance with the preceding objects in which the trough includes a divider assembly that can be pivoted to an elevated position away from the trough to facilitate cleaning to maintain sanitary conditions.

Still another object of the invention is to provide a livestock feeder including wet nipples above the feeding trough to enable the feeder to be used as a dry feeder or wet feeder.

A still further object of the invention is to provide a livestock feeder including a wash plate to enable high pressure water cleaning of the trough and associated components without water or cleaning solution splattering the feed or components which meter and agitate the feed.

Yet another object of the invention is to provide a livestock feeder which is efficient in operation, easy to clean and maintain in sanitary condition, sturdy and capable of withstanding those forces normally imparted to a feeder used by hogs and other animals and which incorporates unique and novel structural arrangements effectively accomplishing the purposes intended.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an exploded group perspective view of the agitator assembly in the feeder.

FIG. 5 is a perspective view of an agitator.

DESCRIPTION OF THE PREFERRED EMBODIMENT

Figure 2:
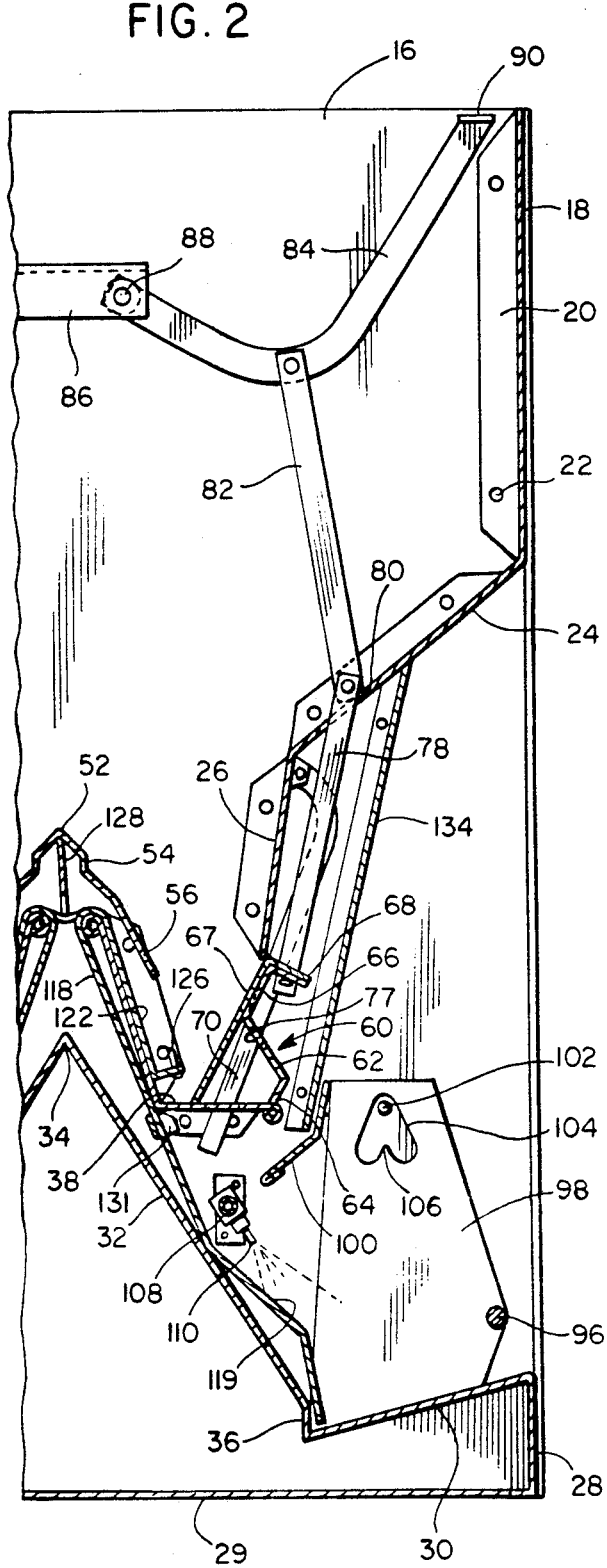
FIG. 2 is a vertical sectional view, on an enlarged scale, taken along section line 2—2 on FIG. 1 illustrating the internal structural details of the livestock feeder with the structure being symmetrical on both sides of a longitudinal center line.
Figure 6:
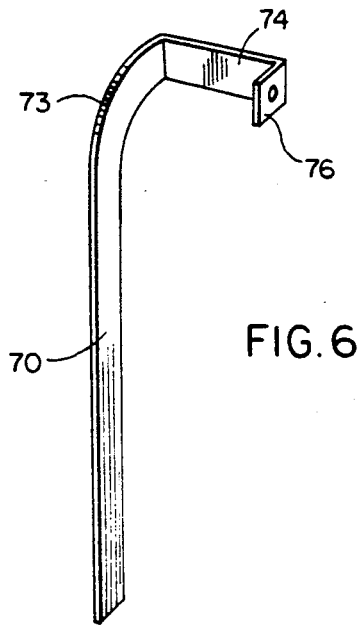
FIG. 6 is a perspective view of the meter gate guide.

The livestock feeder of the present invention is generally indicated by the reference numeral 12 and includes a feed storage bin 14 in which a quantity of dry feed may be placed. The livestock feeder may be provided with a removable cover of any conventional type such as the cover shown in prior U.S. Pat. No. 4,351,274. The feeder 12 includes parallel vertical end walls 16 which extend from the top to the bottom of the feeder and shorter parallel vertical sidewalls 18 fixedly joined to the end wall 16 in a conventional manner to provide a weather tight enclosed space forming the feed storage bin. As illustrated in FIG. 2, the sidewalls 18 may be provided with inturned end flanges 20 secured to the inner surface of the end walls 16 by fastening devices 22 with the vertical height of the sidewalls 18 being only a fraction of the vertical height of the end walls 16 and extending downwardly from the top edge thereof to a junction with an inclined and inwardly extending sidewall 24 which extends inwardly and downwardly from the lower edge of the vertical wall 18 with the wall 24 terminating in a downwardly and inwardly inclined outer wall 26 which is substantially vertical but inclined slightly as illustrated in FIG. 2 with all of the walls 18, 24 and 26 being secured to the end walls 16 in the same manner and with all of the walls 18, 24 and 26 being continuous from end to end of the feeder thus forming the feed storage bin 14.

At the bottom of the feed bin, a partial vertical sidewall 28 is provided between the end walls 16 with the upper edge of the lower vertical sidewall 28 being continuous with or joined with a feed trough 30 in the form of an inwardly and downwardly inclined panel which is connected at its inner end to an upwardly and inwardly inclined panel 32 which forms a feed slope and connects with an identical feed slope on the opposite side of the center line along an apex 34 disposed along the longitudinal center line of the feeder. The lower end portion of the feed slope 32 is provided with a short vertical portion 36 which is continuous with the feed trough 30 and the feed slope 32 thereby defining a feedway. The lower vertical sidewall 28, the feed trough 30, feed slope 32, vertical portion 36 and apex 34 are continuous panels between the end walls and are secured thereto in any suitable manner.

Supported longitudinally in the feed bin 14 is a feed shelf 38 which is generally horizontally disposed and oriented below and generally parallel to the lower end of the outer wall 26 as illustrated in FIG. 2. The outer edge of the feed shelf 38 is provided with a rigidifying curl 40 and the ends of the shelf 38 are provided with a lateral flange 42 for securement to the end wall 16 in a conventional manner. At the inner edge of the feed shelf, an upwardly extending feed shelf back 44 is provided which includes a curl 46 at its upper edge and a flange 48 at each end edge for attachment to the end walls 16. As illustrated in FIG. 2, the feed shelf 38 is spaced slightly above the feed slope 32 and the feed shelf back 44 extends vertically above the apex 34 but the curled edges 46 along the upper edge of the backs 44 are transversely spaced in relation to each other and in relation to the longitudinal center line of the livestock feeder. Positioned above and connecting the backs 44 is a generally inverted V-shaped baffle 50 which includes an apex 52 in spaced parallel relation to the apex 34 and an offset portion 54 as illustrated in FIGS. 2 and 4. The baffle 50 includes a plurality of outward, downwardly opening projections 56 with the portions of the baffle 50 between the projections 56 being engaged with and secured to the feed shelf back 44 by the use of suitable fasteners so that the baffle 50 is connected to and joins the backs 44 with the projections 56 providing a space between the interior of the baffle 50 and the exterior surface of the back 44 and the exterior of the cylindrical curl 46 as illustrated in FIG. 2.

All of the aforementioned structural details are rigidly affixed in relation to each other and extend continuously between the end walls. The bottom of the feeder may be open or provided with a closure panel or any other supporting structure depending upon the particular installational requirements. If a closed bottom is used as illustrated, this eliminates an area which could be occupied by rodents although the device may be mounted on skids for movement to various locations or provided with any suitable supporting structure.

Figure 7:
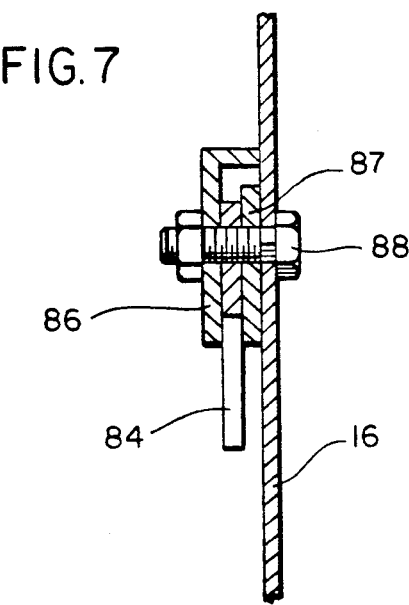
FIG. 7 is a sectional view of meter gate adjustment structure.
Figure 8:
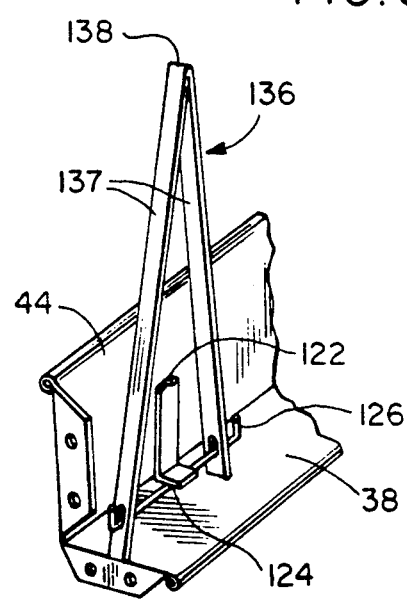
FIG. 8 is a perspective view of an agitator extension.

Movably positioned above the feed shelf 38 is a one-piece meter gate 60 which includes an inwardly and upwardly inclined panel 62 terminating at its lower edge in a downwardly and inwardly inclined panel or flange 64 that in its lowermost position sealingly contacts the upper surface of the feed shelf 38 adjacent its outer curled edge 40 as illustrated in FIG. 2. The upper inner end of the panel 62 is provided with an upwardly and outwardly extending short panel 66 which terminates at its upper edge in an outwardly and downwardly extending flange 68. The flange 68 is reversely bent and of double thickness with the upper portion of flange 68 terminating in an inclined panel 67 which extends against panel 62 and into engagement with shelf 38. The meter gate 60 is guided during its vertical movement by rigid guide straps 70 which have a lower end extending through close fitting apertures 72 in the feed shelf 38 as illustrated in FIGS. 2 and 4 with the upper end of the guide strap being curved inwardly at 72 with a longitudinally outwardly extending flange or strap 74 connected thereto with a lateral flange 76 on the end thereof for stationarily securing the guide strap to the end wall 16. A guide strap 70 extends through apertures 77 in flange 68 and panel 62 at each end of the meter gate 60 for guiding the movement thereof and a lift link 78 is connected to the flange 68 by extending through an aperture therein and provided with a pin 79 underlying the flange 68 with the lift link extending through an aperture 80 in wall 24 and being connected to a connecting link 82 which extends upwardly and is connected to an adjusting lever 84 that has its inner end pivotally attached to end wall 16 by a friction mounting plate 86, a friction bar 87 and friction bolt 88 as shown in FIG. 7. The outer end of lever 84 is provided with a handle 90 by which links 78 and 82 may be elevated thus moving the meter gate 60 between open and closed positions and the friction mounting 86, 87 and 88 secures the meter gate in adjusted position.

Figure 1:
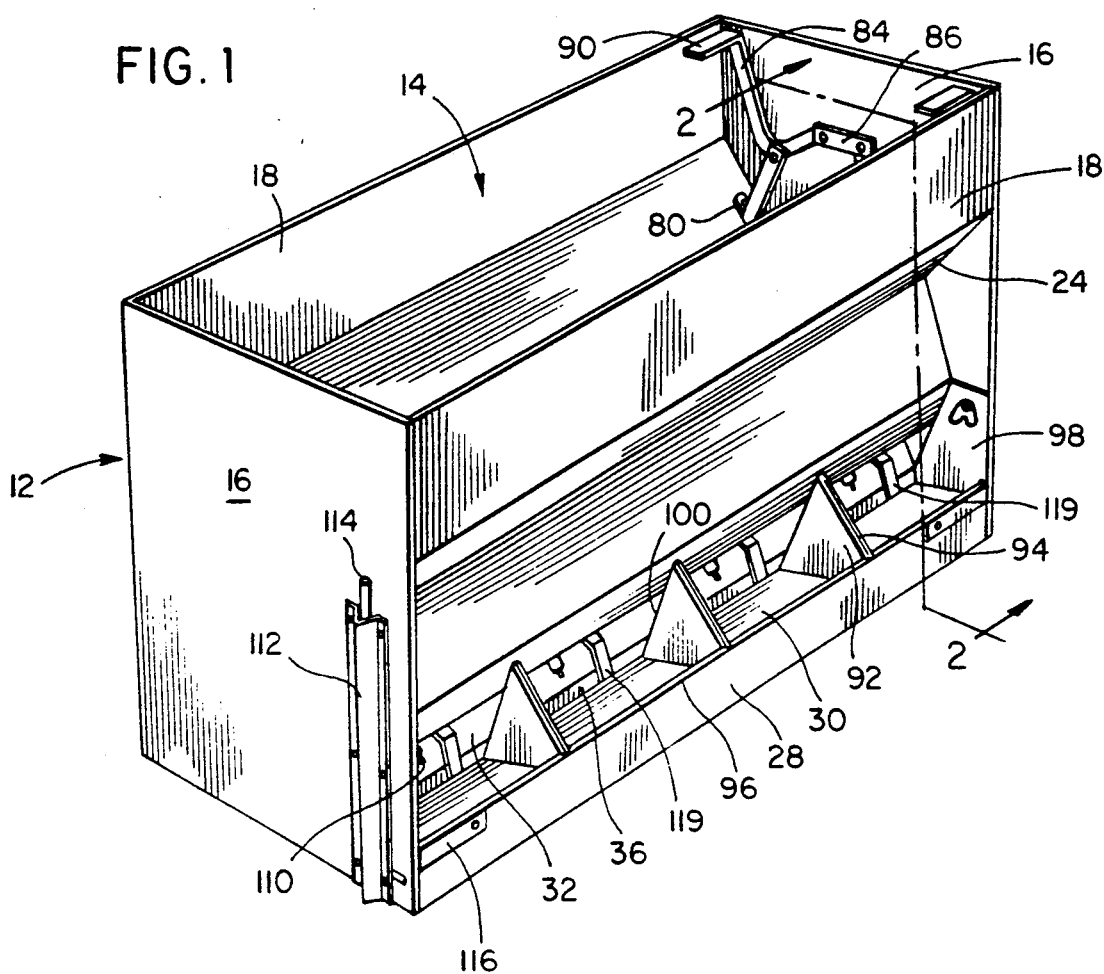
FIG. 1 is a perspective view of the livestock feeder of the present invention.
Figure 3:
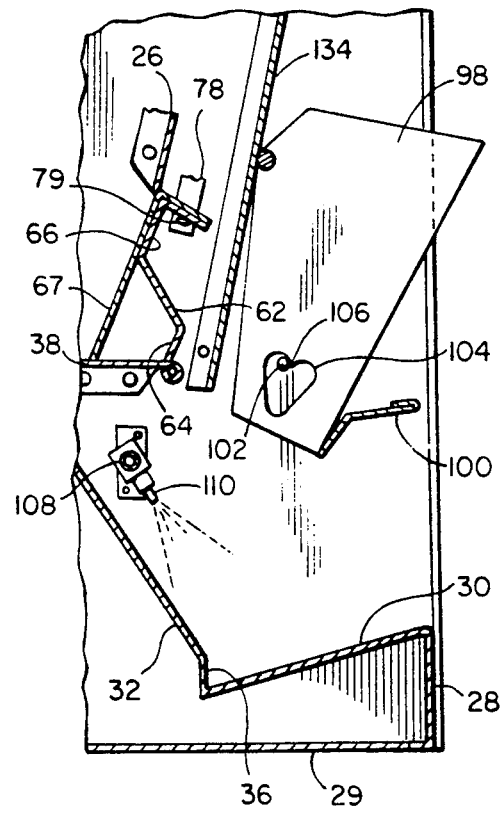
FIG. 3 is a fragmental sectional view of the feed trough portion of the livestock feeder illustrating the divider pivoted upwardly to provide unobstructed access to the top surface of the feed trough.

Positioned above the feed trough 30 is a plurality of middle dividers 92 having inclined outer edges 94 which are curled for reinforcement and to provide a smooth outer edge for engagement by animals using the feeder. The dividers 92 are interconnected by a divider trough bar 96 which retains the dividers 92 in rigid relation. The middle dividers 92 are generally of triangular configuration as illustrated in FIG. 1 whereas end dividers, designated by numeral 98, are trapezoidal in configuration with the trough bar 96 also being connected to the end dividers 98. A tiebar 100 interconnects the dividers 92 and 98 in opposite relation to the bar 96 to retain the dividers in spaced parallel relation. The end dividers 98 are secured to the end walls in a manner to enable the dividers to pivot from the position illustrated in FIGS. 1 and 2 to the position illustrated in in FIG. 3 to provide access to the feed trough 30. This is accomplished by a pivot member 102 in the form of a pin or bolt attached to each end wall 16 and extending into a generally triangular-shaped opening 104 in each end divider 98 in which the base of the triangular-shaped opening is provided with an inward projection 106 so that when the dividers are to be pivoted upwardly, they are initially lifted upwardly so that the lower ends thereof can clear the trough 30. When the dividers are in their upwardly pivoted position, the entire upper surface area of the trough 30 and feed slope 32 below the feed shelf 38 is accessible for cleaning.

The area inwardly of the dividers 92 and 98 and below the feed shelf 38 is provided with a water pipe or manifold 108 having discharge nipples 110 incorporated therein and associated with the space between the dividers so that the animals may engage the nipple 110 for discharge of water when desired. The end of the manifold 108 extends through the end wall 16 and upwardly behind a manifold shield 112 attached to the exterior of the end wall 16 with the pipe 114 extending therefrom and connected to a suitable water source. A latch structure 116 is mounted along each end of the trough bar 96 and includes a spring biased locking pin slidable therein which can be retracted to enable the dividers to move upwardly when desired with the spring biased pin engaging an aperture in the end wall 16 when the dividers are in their operative lowered position. When the dividers are lifted and pivoted upwardly, the pin or bolt members 102 are received in one of the recesses or notches formed by the projection 106 thereby temporarily retaining the dividers in their elevated position.

Positioned in each feeding station above the feed trough 30 and along the surface of the feed slope 32 and extending upwardly into engagement with the feed on the feed shelf 38 is an agitator 118 in the form of a metal strap resting against the lower portion of the slope 32 and vertical portion 36. The upper end portion of the agitator 118 diverges from the slope 32 and includes a reversely bent upper end 120 which is positioned over and supported by the curled edge 46 on the back 44 with the end portion 122 of the agitator 118 extending downwardly in relation to the back 44 and terminating in a laterally extending flange 123 and lateral rod 124 having upturned ends 126 which are oriented above and adjacent the feed shelf 38. The projections 56 on the baffle 50 enable movement of the agitator components 118–126 and also support to a large extent the feed that overlies the agitator components. An agitator lock plate 128 is positioned above and centrally of the curled edges 46 on the backs 44 and the lower edge of the plate 128 is provided with laterally extending flanges 130 which are curved with the concave side facing downwardly to fit on the curled edges 46. The flanges 130 and the lower edge of the plate 128 have notches 132 formed therein which straddle and receive the reversely curved portion 120 of the agitator 118 so that the agitator 118 may be moved in relation to the feed shelf 38, back 44, flanges 130, lock plate 128 and baffle 50. Also, a channel-shaped lock plate 131 is mounted on each agitator 118 and engages under the inner edge of the feed shelf 38 to limit lateral swinging movement of the agitator. The lower end of agitator 118 may be optionally offset at 119 to facilitate engagement by animals.

As illustrated, the feeder 12 includes the feed trough 30 with dividers and a bin 14 oriented above the trough with the agitator 118 automatically feeding the stored feed onto the trough as the animal calls for it by moving the agitator. The flow of feed from the bin 14 to the trough 30 is thus controlled by the agitator 118 and by the panel 67 on meter gate 60. Each of the feeding stations or spaces between adjacent dividers is provided with an agitator and one of the wet nipples 110 for the comfort and convenience of of individual animals. Feed is supported above the agitators by the baffle 50 with projections 56 oriented in longitudinally spaced relation therealong which overlies a portion of the agitator and eliminates the weight of the feed from the upper end portion of the agitator and eliminates passage of feed between curled edges 46. The agitator 118 has two locks on it which keep the agitator centralized between the dividers so that after the hog has moved it, it will return back to the center thus ensuring that the same amount of feed flow will occur each time the agitator is moved from its center position. Thus, the hog will have a constant rate of feed flow regardless of whether the feeder is full, nearly empty, wet or dry with the meter gate 60 being the only factor which will change the feed flow rate. The meter gate 60 is unique in that it will close the feed flow completely for sow limit feeding or it can be adjusted in relation to the feed shelf with the agitator moving the feed off the feed shelf when the meter gate is opened even to a slight degree. The meter gate 60 may be opened completely for emptying the feeder or dumping a predetermined quantity of feed into the trough for controlled or time feeding. The meter gate is controlled by the lift linkage with the friction bolt 87 being such as to enable the operating lever 84 to be stopped and retained at any position. From a sanitation standpoint, the feed is retained where the animals consuming the feed, rodents or weather cannot gain access to the feed and therefore cannot contaminate the feed. This is accomplished by raising the feed to the feed shelf 38 and arranging the meter gate 60 so that it closes down over the outer edge of the feed shelf. In addition, a wash plate or shield 134 in the form of a panel is provided so that water splatter is prevented from engaging the exterior of the metering gate and associated mechanism. The ease of maintaining cleanliness is enhanced by the pivoting divider assembly so that the dividers 92 and 98, the divider trough bar and the tie bar can be pivoted upwardly away from the bottom of the feed trough 30 so that the feed trough and feedway can be easily cleaned. When the divider assembly is in the up position, the meter gate can be completely opened and all feed emptied out of the bin or the meter gate can be completely closed thus sealing off the feed shelf for ease of washing.

When using the feeder, the divider assembly is normally in the down position and latched by using the spring loaded pins received in corresponding holes in the end walls. The meter gate 60 is then elevated to the desired level so that as the animals or hogs move the agitator 118 from center, it pushes only the feed they will consume as they are standing at the feeding station thereby eliminating dirt or saliva contaminated feed or stale feed being retained in the trough which will not be eaten by the hogs since it is well known that when a hog or pig, regardless of age or size, is feeding, the animal will only move the agitator once before eating all the feed that has fallen down onto the feed trough previously. The inclined configuration of the feed trough and feed slope structure provides a feedway so that the animal can trap the feed between the feedway and dividers thus eliminating frustration in trapping the feed and eliminating saliva buildup which results in sour feed buildup. If more feed is desired, by the operator, the meter gate can be set at a desired height to enable each movement of the agitator to move a greater quantity of feed off the feed shelf for discharge onto the trough. The individual feeding stations and agitators encourages efficient feed consumption with the dividers and slope bottom of the trough providing more jowl room and ear room for the animals. The dividers keep the animals from pushing feed from one end of the feed trough toward the other and the angle of the bottom of the feed trough matches a comparable angle for the hog and the trough height is oriented to satisfy the size hog that the feeder accommodates from pig to sow. The slope on the trough also helps in keeping feed in the feedway rather than having stale feed adjacent the trough bar and the slope insures a good reservoir of water along the feedway if the feeder is used wet. The individual water nipples connected to the manifold enables the animal to individually obtain water when desired. All of the edges of the components are edge rolled or hemmed to provide safety and reduce injury. Also, the feeder is capable of use with various types of feed and rations which is enhanced by an agitator extension 136 which sets on the feed shelf 38 and is in the form of a pair of strap members 137 connected together at an apex 138 and diverging downwardly therefrom with each strap member resting on the top of the feed shelf 38 and including apertures through which the rod or bar 124 on the agitator extends so that the extension 136 does not add any weight to the agitator regardless of the vertical height of the feeder. Also, the extension only moves when the agitator is swinging and it does not swing but only shakes or rattle as the agitator 118 swings.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A livestock feeder comprising a feed storage bin, said bin including a generally vertical inwardly inclined outer wall and a generally vertical inwardly inclined feed back in spaced relation to the outer wall, a feeding trough spaced below the bin, a generally horizontally disposed feed shelf connected to a bottom edge of the feed back and forming a portion of the bottom of the bin, said feed shelf extending outwardly from the feed back and spaced below a bottom edge of the outer wall and spaced above the feed trough to discharge feed by gravity off an outer edge of the shelf into the feed trough, an elongated meter gate positioned above the feed shelf in movable contact with the bottom edge of the outer wall and movable into contact with a top surface of the feed shelf adjacent its outer edge for controlling the discharge of feed from the bin, means supporting said meter gate for movement toward and away from the feed shelf to completely close the bottom portion of the bin by engagement with the shelf or provide an elongated slot-like opening for discharge of feed from the storage bin onto the trough when the meter gate is elevated above the feed shelf, means connected with the meter gate to adjust it toward and away from the feed shelf, and an agitator means extending from a point adjacent the feed trough to an area slightly above the feed shelf for moving feed off the feed shelf when the meter gate is in an elevated position with an end of the agitator means adjacent the feed trough including means engaged by an animal obtaining feed from the feed trough to move the agitator means for assisting in discharge of the feed into the feed trough.

2. The livestock feeder as defined in claim 1 wherein said feed trough includes an upwardly and outwardly inclined bottom panel and an upwardly inclined feed slope at an inner edge thereof defining a feedway with the feedway being disposed under the edge of the feed shelf engageable by the meter gate for gravity discharge of feed into the feedway.

3. The livestock feeder as defined in claim 2 together with a divider assembly mounted above the feed trough to divide the feed trough and feedway into a plurality of feeding stations, each station being of a size to receive the head portion of a single animal feeding from the trough.

4. The livestock feeder as defined in claim 3 wherein the divider assembly includes a plurality of dividers supported in spaced relation by a pair of longitudinal members, means supporting the dividers for movement from a position in engagement with the trough and feedway to an elevated position above the trough to enable the trough and feedway to be easily cleaned.

5. The livestock feeder as defined in claim 4 together with an elongated pipe mounted above the trough and feedway and adapted to be connected to a supply of liquid and a plurality of discharge nipples on said pipe with one nipple being arranged in the area between each pair of adjacent dividers for manipulation by an animal consuming feed from that space.

6. The livestock feeder as defined in claim 1 together with extension means mounted on said agitator means, said extension means including an elongated upwardly extending substantially inverted V-shaped strap having its lower ends resting on the feed shelf and extending generally vertically therefrom, the lower end portion of said extension being loosely connected to the portion of the agitator means overlying the feed shelf for agitating movement of the extension when the agitator means is moved.

7. The livestock feeder as defined in claim 1 wherein said means supporting the meter gate includes a pair of guide members rigidly mounted on the bin, said meter gate being angled and provided with spaced apertures through which said guide members are slidably received.

* * * * *